United States Patent
Sonne et al.

(10) Patent No.: US 9,163,194 B2
(45) Date of Patent: *Oct. 20, 2015

(54) COPOLYMERS FOR USE AS PARAFFIN BEHAVIOR MODIFIERS

(71) Applicant: Baker Hughes Incorporated, Houston, TN (US)

(72) Inventors: Jennifer Louise Sonne, Houston, TX (US); Matthew Hilfiger, Richmond, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/710,921

(22) Filed: Dec. 11, 2012

(65) Prior Publication Data

US 2013/0150272 A1    Jun. 13, 2013

Related U.S. Application Data

(60) Provisional application No. 61/569,990, filed on Dec. 13, 2011.

(51) Int. Cl.
*C10G 73/00* (2006.01)
*C10L 1/192* (2006.01)
(Continued)

(52) U.S. Cl.
CPC .............. *C10M 133/06* (2013.01); *C09K 8/524* (2013.01); *C10L 1/238* (2013.01); *C10L 10/14* (2013.01); *C10M 129/66* (2013.01); *C10M 129/68* (2013.01); *C10M 145/26* (2013.01); *C10M 159/005* (2013.01); *C10M 159/12* (2013.01); *C10M 2205/022* (2013.01); *C10M 2209/043* (2013.01); *C10M 2209/10* (2013.01);

(Continued)

(58) Field of Classification Search
CPC .......... C10M 133/06; C10M 159/005; C10M 145/26; C10M 159/12; C10M 129/66; C10M 129/68; C10M 2209/105; C10M 2209/109; C10M 2209/108; C10M 2209/104; C10M 2209/101; C09K 8/524; C10L 10/14; C10L 1/238
USPC ............ 44/313, 351, 353; 166/308.6; 436/29, 436/139; 585/10, 11, 12, 14, 17; 208/15, 208/20, 21, 24
See application file for complete search history.

(56) References Cited

U.S. PATENT DOCUMENTS

| | | |
|---|---|---|
| 2,888,403 A | 5/1959 | De Groote et al. |
| 2,962,524 A | 11/1960 | Hostettler et al. |

(Continued)

FOREIGN PATENT DOCUMENTS

WO     WO 03054120 A1 *  7/2003

OTHER PUBLICATIONS

International Search Report in PCT/US2012/069120, dated Apr. 25, 2013.

*Primary Examiner* — Pamela H Weiss
(74) *Attorney, Agent, or Firm* — Mossman Kumar & Tyler PC

(57) ABSTRACT

Lactone/alkylene oxide polymers are useful as additives to inhibit or prevent the deposition of paraffin in hydrocarbon fluids, particularly crude oil produced from a subterranean formation. These polymers are random or block polymers made from addition reactions of a hydroxyl- and/or amine-containing base compound with at least one lactone monomer and at least one alkylene oxide monomer. In one non-limiting embodiment the lactone monomer is optional.

19 Claims, 2 Drawing Sheets

(51) Int. Cl.

| | |
|---|---|
| *C10M 133/06* | (2006.01) |
| *C10M 129/66* | (2006.01) |
| *C10M 129/68* | (2006.01) |
| *C10M 159/12* | (2006.01) |
| *C10M 145/26* | (2006.01) |
| *C10M 159/00* | (2006.01) |
| *C10L 1/238* | (2006.01) |
| *C10L 10/14* | (2006.01) |
| *C09K 8/524* | (2006.01) |

(52) U.S. Cl.
CPC ... *C10M2209/101* (2013.01); *C10M 2209/102* (2013.01); *C10M 2209/103* (2013.01); *C10M 2209/104* (2013.01); *C10M 2209/105* (2013.01); *C10M 2209/108* (2013.01); *C10M 2209/109* (2013.01); *C10M 2209/12* (2013.01); *C10M 2217/02* (2013.01); *C10M 2217/042* (2013.01); *C10M 2217/044* (2013.01); *C10N 2220/021* (2013.01); *C10N 2230/02* (2013.01); *C10N 2230/04* (2013.01); *C10N 2230/08* (2013.01); *C10N 2230/68* (2013.01); *C10N 2240/10* (2013.01); *C10N 2260/00* (2013.01); *C10N 2260/06* (2013.01)

(56) References Cited

U.S. PATENT DOCUMENTS

| | | | |
|---|---|---|---|
| 3,169,945 A | 2/1965 | Hostettler et al. | |
| 3,312,753 A | 4/1967 | Bailey, Jr. et al. | |
| 3,689,531 A | 9/1972 | Critchfield et al. | |
| 3,778,458 A | 12/1973 | Morehouse | |
| 3,867,353 A | 2/1975 | Hsieh et al. | |
| 3,951,161 A | 4/1976 | Rohrback et al. | |
| 4,110,283 A | 8/1978 | Capelle | |
| 4,291,155 A | 9/1981 | Brochet | |
| 4,538,682 A | 9/1985 | McManus et al. | |
| 4,582,131 A | 4/1986 | Plummer et al. | |
| 4,650,596 A | 3/1987 | Schlueter et al. | |
| 5,525,702 A * | 6/1996 | Nace | 528/354 |
| 5,528,824 A | 6/1996 | Anthony et al. | |
| 6,218,490 B1 | 4/2001 | Brunelli et al. | |
| 6,984,710 B2 * | 1/2006 | Meyer | 528/129 |
| 7,141,643 B2 | 11/2006 | Dixon et al. | |
| 2005/0215437 A1 | 9/2005 | Shmakova-Lindeman | |
| 2006/0035793 A1 | 2/2006 | Goldman | |
| 2007/0051033 A1 | 3/2007 | Martin et al. | |
| 2007/0062101 A1 | 3/2007 | Delamotte et al. | |
| 2008/0029430 A1* | 2/2008 | Loh et al. | 208/19 |
| 2012/0059088 A1* | 3/2012 | Hilfiger et al. | 523/418 |
| 2013/0231418 A1* | 9/2013 | Hilfiger et al. | 523/414 |

* cited by examiner

| Blank | 10 | 13 | 16 | 17 | 19 |
|---|---|---|---|---|---|
| Untreated | A | B | 50%A, 50%B | H | G |
| Thick, Even deposit | Thinner, Even Deposit | Thin, Flakey Deposit | Thin, Flakey Deposit | Thin gradient deposit | Thick, even deposit |

| Blank | 12 | 15 | 20 |
|---|---|---|---|
| Untreated | A | B | C |
| Thick, chunky layer | Flaky, uneven deposit | Thin, even | Thin, even |

| Blank | 21 | 22 | 23 |
|---|---|---|---|
| Untreated | A | B | C |
| Even, thick layer | Flaky, uneven deposit | Slightly flaky | Even, thinner deposit |

COPOLYMERS FOR USE AS PARAFFIN BEHAVIOR MODIFIERS

CROSS-REFERENCE TO RELATED APPLICATION

This application claims the benefit of U.S. Provisional Patent Application Ser. No. 61/569,990 filed Dec. 13, 2011, incorporated herein by reference in its entirety.

TECHNICAL FIELD

The present invention relates to paraffin inhibitors, and more particularly relates in one non-limiting embodiment to paraffin inhibitors that are polymers of a hydroxyl- and/or amine-containing base compound with at least one lactone and/or at least one alkylene oxide.

TECHNICAL BACKGROUND

Fluids produced from oil wells penetrating an oil-bearing formation primarily include crude oil and water and are herein referred to as formation fluids. A formation fluid may also contain natural gas and natural gas condensate which may or may not be desirable and may be the primary product of a given well in which case the well is referred to as a gas/gas condensate well. A formation fluid may also contain carbon dioxide ($CO_2$) and insoluble clay and silica particles from the reservoir. Contained within the formation fluids are components that under certain conditions can precipitate and impede the production of oil and gas. These components include paraffin and asphaltenes from crude oils and gas condensates and inorganic mineral scales from formation water. Paraffin is a hydrocarbon compound that can precipitate or deposit on production components as a result of the changing temperatures and pressures within the production system. Paraffin may precipitate and deposit as waxy substances that may build up, and if severe, may restrict production and can also gel crude oil. Asphaltenes are organic materials consisting of aromatic and naphthenic ring compounds that may contain nitrogen, sulfur and oxygen molecules; the asphaltene fraction of crude may be understood as an organic part of the oil that is not soluble in straight-chain solvents such as n-pentane or n-heptane.

It is known in the art of oil and gas production to eliminate or mitigate the effects of undesirable paraffin, asphaltene, and scale precipitation. For example, to aid oil and gas production, many chemicals, referred herein as "additives", which include paraffin inhibitors, asphaltene inhibitors, scale inhibitors, and the like, are often injected from a surface source into wells or through flowlines, such as umbilicals, to treat the formation fluids flowing through such wells and flowlines to prevent or control the effects of precipitation of paraffin, asphaltenes, and mineral scale.

These additives can be injected continuously or by batches into wellbores, at wellheads, or other locations in flowlines or pipelines carrying formation fluids. In addition, an additive can be injected into a near wellbore formation via a technique commonly referred to as "squeeze" treatment, from which the additive can be slowly released into the formation fluid. Injection of additives upstream of the problem location is preferred. Sometimes, additives are introduced in connection with electrical submersible pumps, as shown for example in U.S. Pat. No. 4,582,131, or through an auxiliary line associated with a cable used with the electrical submersible pump, such as shown in U.S. Pat. No. 5,528,824. In addition, in wells without a packer in the completion, additives may be applied via pump or truck into the annular space between the tubing and the casing with a fluid flush driving the additive into the formation fluids.

Of the additives that can be added to formation fluid from oil and gas wells, the paraffin inhibitors are especially important. U.S. Pat. No. 4,110,283 to Capelle discloses that a copolymer of 4-vinyl pyridine and acrylic acid esters dispersed in an aqueous medium can prevent the deposit of solid paraffin on the walls of containers and pipelines carrying oil. U.S. Pat. No. 3,951,161 to Rohrback, et al., discloses a method of using electrical contact resistance to detect the formation of paraffin solids in oil and gas wells. U.S. Pat. No. 4,538,682 to McManus, et al., discloses a method for removing paraffin deposits. All of these patents illustrate the need to control the formation of paraffin deposits.

Paraffin inhibitor additives are typically applied in the form of organic solutions or aqueous microemulsions or admixtures. The use of liquid additives is not without problems. At cold temperatures, such as in cold weather or deepwater subsea locations, the additives may freeze or gel during transportation or use. Stated another way, existing commercial paraffin inhibitors may lose solubility at high pressures and low temperatures. Supplying a source of heat, particularly for deepwater and remote well sites can be a problem. Also, when supplying additives in the form of liquids, any solid active components must be co-shipped in solution. The use of a solvent to form the solution requires that inert or non-active components must be co-shipped with the active components, which increases the cost of shipping.

Besides preventing or inhibiting the deposition of paraffin, additives may be introduced into hydrocarbon fluids to modify the crystal structure of the paraffin to inhibit or prevent paraffin from depositing. In one non-limiting explanation, some additives serve as dispersants to disperse already deposited paraffin, to keep the paraffin in a hydrocarbon fluid from depositing or otherwise combining or agglomerating to cause difficulties. It will be appreciated that the term "hydrocarbon" as used herein is broader than simply to mean organic compounds consisting only of hydrogen and carbon, although those are intended. For instance, "hydrocarbon fluid" as used herein encompasses oil and gas, including crude oil and natural gas. However, "hydrocarbon" as used herein does not encompass polymers unless otherwise noted.

Additionally, it is known to introduce additives to hydrocarbon fluids to modify their pour points. The pour point of a liquid is the lowest temperature at which it will pour or flow under the conditions of interest. For instance, it is a rough indication of the lowest temperature at which oil is readily pumpable. For crude oil, a high pour point is generally associated with a high paraffin content. Thus, it is desirable to include additives that will lower the pour point of crude oil and other hydrocarbon fluids.

It would be desirable in the art of oil and gas production to use paraffin inhibitor compositions that have a higher concentration of active components than conventional paraffin inhibitors. It would be particularly desirable to use such compositions that allow for higher active component concentrations under cold temperatures—that are more soluble at the high pressure and lower temperatures typical for umbilical applications. It would thus be very desirable and important to discover methods and compositions for economically inhibiting or preventing paraffin formation in hydrocarbon fluids, such as formation fluids from an oil well or gas well.

SUMMARY

There is provided, in one non-limiting form, a method of inhibiting or preventing the deposition of paraffin in a hydrocarbon fluid, modifying the crystal structure of the paraffin, and/or lowering the pour point of the crude oil, particularly as compared with the absence of the polymer. Additionally it may act as a dispersant for paraffin in the fluids. The method involves adding to the hydrocarbon fluid an effective amount of a polymer to inhibit or prevent the deposition of paraffin therein, where the polymer comprises a random or block polymer made from addition reactions of a hydroxyl- and/or amine-containing base compound with at least one alkylene oxide monomer and optionally at least one lactone monomer. Additionally, the polymers may be crosslinked with multifunctional epoxies, acids and anhydrides, such as but not limited to diepoxides of bisphenol-A, succinic acid, tartaric acid, citric acid, and maleic anhydride.

DETAILED DESCRIPTION

Figure 1:
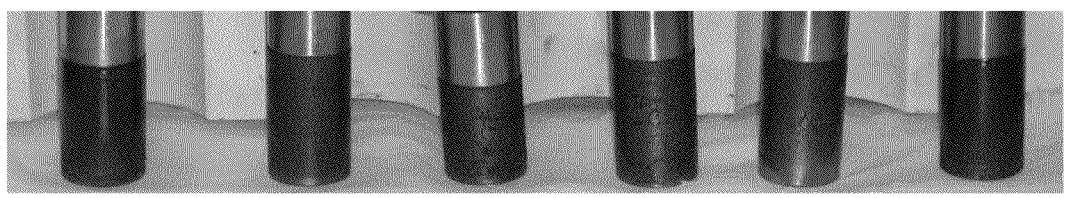
FIG. 1 is a photograph of cold finger probes from various products used in a blank and Examples 10, 13, 16, 17 and 19 with a description of the appearance of each.

While the chemistry of lactone/oxide polymers has been known since the 1960s, (e.g. see U.S. Pat. No. 2,962,524), it has only now been discovered that lactone/alkylene oxide polymers are useful as paraffin inhibitors for hydrocarbons in general, and for crude oil in particular.

The lactone/alkylene oxide polymers may be obtained by reacting a suitable hydroxyl- or amine-containing base compound with a suitable lactone monomer and an alkylene oxide monomer. Suitable hydroxyl- and/or amine-containing base compounds include, but are not necessarily limited to, methanol, propylene glycol, glycerol, pentaerythritol, sucrose, glucose, sorbitol, fructose, maltitol, polyvinyl alcohol, polysaccharides including starch derivatives, hydroxyl ethyl cellulose (HEC), carboxy methyl cellulose (CMC) and/or cyclodextrin, polyesters, polyethers, polyacids, polyamides, hydroxylamines, ethanolamine, diethanolamine, triethanolamine, polyethyleneimines, peptides and combinations thereof.

Suitable lactone monomers include, but are not necessarily limited to, those having 3 to 7 carbon atoms in the central ring, including those of

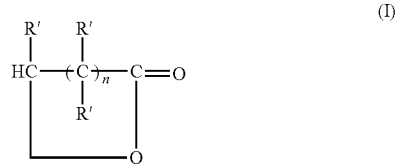

(I)

formula (I) where n is at least 1 and the R' groups may each independently be any hydrogen, alkyl, cycloalkyl, or aromatic groups. In another non-limiting embodiment, n may range from 1 to 8; alternatively from 2 independently to 6. The R' group may have from 0 independently to 15 carbon atoms, in another non-restrictive embodiment from 1 to 13 carbon atoms, alternatively from 1 independently to 6 carbon atoms. Particular suitable lactones include, but are not necessarily limited to, propiolactone, butyrolactone, valerolactone, caprolactone and mixtures thereof, including all structural isomers of these.

Suitable alkylene oxide monomers include, but are not necessarily limited to, ethylene oxide (EO), propylene oxide (PO), butylene oxide and mixtures thereof.

It has also been discovered that the lactone monomer is optional for these polymers. That is, suitable polymers may comprise a random or block polymer made from addition reactions of a hydroxyl- and/or amine-containing base compound with at least one alkylene oxide monomer, where the base compounds and the alkylene oxide monomers are those described herein.

In addition, these polymers may be optionally capped by reacting with a suitable monofunctional capping monomer, including but not necessarily limited to styrene oxide, glycidal ether, benzylglycidal ether, C1-C24 glycidal ether, C2-C24 carbocyclic acids and other monoepoxides.

The weight ratio of at least one lactone monomer to the hydroxyl- or amine-containing base compound ranges from about 0.1:1 independently to about 99.9:1. Alternatively, the weight ratio of at least one lactone monomer to the hydroxyl- or amine-containing base compound ranges from about 1:99 independently to about 99:1, and in another non-limiting embodiment ranges from about 5:95 independently to about 95:5. The word "independently" as used herein with respect to ranges means that any lower threshold may be combined with any upper threshold to give an acceptable alternative range.

Similarly, the weight ratio of at least one alkylene oxide monomer to the hydroxyl- or amine-containing base compound ranges from about 0.1:1 independently to about 99.9:1. Alternatively, the weight ratio of at least one alkylene oxide monomer to the hydroxyl- or amine-containing base compound ranges from about 1:99 independently to about 99:1, and in another non-limiting embodiment ranges from about 10:90 independently to about 90:10. These ratios are true whether or not a lactone monomer is employed.

The reaction conditions used to make the polymers described herein include a temperature range between about 100 to about 150° C., and the pressure preferably should not exceed about 60-80 psi (about 0.4 to 0.5 MPa). Solvents for these polymers are typically the liquid hydroxyl- and/or amine-containing base compound starting materials themselves, for instance polyols, but in some cases aromatic solvents have been utilized, for instance such as xylene. Suitable catalysts may be alkali metal hydroxides, including, but not necessarily limited to, NaOH and/or KOH.

The polymers herein are structurally and chemically distinct from polymers made from the alkylation of phenol-formaldehyde resins. In one non-limiting embodiment, the random or block copolymers herein have an absence of phenol-formaldehyde resins, The weight average molecular weight of the polymers described herein may range from about 2000 independently to about 1,500,000 g/mol; alternatively from about 4000 independently to about 500,000 g/mol. Some of the polymer products, such as those based on the polyethyleneimine, could be near 1 million or greater in weight average molecular weight.

Effective paraffin-inhibiting amounts or dosages of the polymer in the hydrocarbon fluids range from about 5 ppm independently to about 10,000 ppm; alternatively, from about 100 independently to about 5000 ppm, and in a different non-limiting embodiment from about 200 to about 1000 ppm.

The hydrocarbon fluids that may be inhibited against paraffin formation using the lactone/alkylene oxide copolymers and/or other copolymers described herein are not necessarily limited to crude oils (crudes). The methods and behavior modifiers herein may generally be used in inhibiting paraffin formation in other hydrocarbon fluids including, but not necessarily limited to condensate, home heating oil, engine oil, other lubricating oils, etc. In addition, the invention may be used as a pour point depressant or as a dispersant for already formed paraffin deposits.

The paraffin inhibitors here are expected to prevent or inhibit paraffin crystallization, precipitation, deposition and other any other mechanisms of paraffin formation. Further, it is not necessary for the paraffin inhibitors herein to be completely effective in preventing paraffin formation for the method to be considered successful. The method may be considered successful if paraffin formation is inhibited to an extent that is beneficial for the production, handling, processing, transportation and use of the hydrocarbon fluid.

All of the copolymers are expected to be or are known to be highly soluble in organic solvents including, but not necessarily limited to, xylene, toluene, methanol, isopropyl alcohol, and mixtures thereof.

Further, the polymers described herein may also be blended with other optional, additional polymers such as ethylene-vinyl acetate (EVA), alkylphenol formaldehyde resins, and other blends of the polymers described herein. These additional polymers may be added to the hydrocarbon fluid before, during and/or after the random or block copolymers described herein are added.

Further and as noted previously, the polymers may be crosslinked with multifunctional epoxides, acids and anhydrides, such as but not limited to diepoxides of bisphenol-A, succinic acid, tartaric acid, citric acid, and maleic anhydride. The proportion of crosslinkers would be roughly or about 0.1 to about 5 wt % of the formulation, that is of the total of the random or block copolymer. Further, the molecular weight range would be up to, or possibly above about 2,000,000 g/mol, in one non-limiting example up to about 3,000,000 g/mol or alternatively up to about 5,000,000 g/mol. Such crosslinked random or block copolymers would have increased ability for crystal modification through improved functionality as compared to hydrocarbon fluids without these polymers, and/or improved dispersancy as compared to hydrocarbon fluids without these polymers.

The invention will now be illustrated with respect to certain Examples which are not intended to limit the invention, but instead to more fully describe it.

Cold Finger Test

The cold finger device consists of a temperature-controlled metal probe, which is inserted into samples of stirred crude oil for specified time duration, usually about 16 hours. The cold finger probe is set to a temperature below the crude oil Wax Appearance Temperature (WAT). The "bulk" crude oil temperature is generally set at or slightly above the crude oil WAT and is controlled at the surface of the wall of the bottle containing the crude oil sample. With proper control of the bulk oil and cold finger temperatures, a ΔT driving force for deposition can be set such that the cold finger set-up can be used to simulate a section of flow line in a production system. The cold finger simulates a cold flowline surface and stirring simulates the flowline flow-field. The amount of paraffin deposition on the cold finger probes after testing can be examined to evaluate differences in untreated and chemically treated oils. The percent inhibition is determined by calculating the deposit density. The deposit density is found by measuring the weight of the deposit divided by the surface area. Density can be used to determine a density percent inhibition in the total deposit in chemically treated crude oils versus untreated crude oils. Visual assessments of the deposits are also made. These include assessing the amount of cold finger surface which is free from deposition and, at times, noting the differences in whether the treated crude oil deposits have different characteristics than the untreated deposits.

Table I shows the types of monomers and ratios used to make the polymer products using the methods described previously. Caprolactone was the lactone used.

TABLE I

| Monomer Ratios for Polymer Products | | | |
|---|---|---|---|
| | PO | Lactone | EO |
| Product A | 8.9 | 2.5 | 1 |
| Product B | 3.8 | 1 | 1.3 |
| Product C | 2.6 | 1 | 1.3 |
| Product D | 7.3 | 3.6 | 1 |
| Product E | 3.6 | 1 | — |
| Product F | 1.9 | — | 1 |
| Product G | 4.4 | — | 1 |
| Product H | 14.4 | — | 1 |
| Product I | 1 | — | — |

Table II presents dose and percent inhibition data for Products A-I. The first section presents the results at a WAT of 96° F. (36° C.), probe temperature of 76° F. (24° C.) and oil temperature of 101° F. (38° C.) for all Products using a crude from the Rocky Mountains Crude #1. WAT is the Wax Appearance Temperature, where the wax is the paraffin. Essentially, the WAT is the temperature at which the largest paraffin molecules are no longer soluble in the oil. This is the temperature within an oil production system that drives wax deposition. The WAT is used to determine the temperature of the oil during cold finger testing, which is set at 5° F. (about 3° C.) above the WAT in order to maintain the paraffin in solution. Since wax deposition is a thermally driven process, the probe temperature is set 20° F. (about 11° C.) below the WAT to allow wax to deposit under this temperature differential.

The second section presents the results for Products A, B, 50/50 A/B, C, G and H for Crude #1 at a WAT of 100° F. (38° C.), probe temperature of 85° F. (29° C.) and oil temperature of 110° F. (43° C.). Photographs of some of the cold finger probes are shown in the indicated FIG. 1 or 2. The third section presents the results for Products A, B and C for a second crude from the Rockies (UPRR) at a WAT of 88° F. (31° C.), probe temperature of 93° F. (34° C.) and oil temperature of 68° F. (20° C.). Photographs of these cold finger probes are shown in the FIG. 3.

TABLE II

| | Paraffin Inhibition Results for Products A-I | | | |
|---|---|---|---|---|
| Ex. | Oil Source Rockies- Crude #1a Product | WAT, °F. (°C.) 96 (36) Dose (ppm) | Probe Temp, °F. (°C.) 76 (24) Percent Inhibition | Oil Temp, °F. (°C.) 101 (38) Fig. Reference |
| 1 | A | 500 | 49.8 | — |
| 2 | B | 500 | 0 | — |
| 3 | C | 500 | 0 | — |
| 4 | D | 500 | 4.3 | — |
| 5 | E | 500 | 0 | — |
| 6 | F | 500 | 0 | — |

TABLE II-continued

Paraffin Inhibition Results for Products A-I

| | | | | |
|---|---|---|---|---|
| 7 | G | 500 | 3.2 | — |
| 8 | H | 500 | 3.0 | — |
| 9 | I | 500 | 0 | — |

| Oil Source Rockies- Crude #1b Product | WAT, °F. (°C.) 100 (38) Dose (ppm) | Probe Temp, °F. (°C.) 85 (29) Percent Inhibition | Oil Temp, °F. (°C.) 110 (43) Fig. Reference |
|---|---|---|---|
| 10 | A | 500 | 67.2 | 1 |
| 11 | A | 500 | 83.0 | — |
| 12 | A | 300 | 13.2 | 2 |
| 13 | B | 500 | 63.8 | 1 |
| 14 | B | 500 | 81.9 | — |
| 15 | B | 300 | 30.7 | 2 |
| 16 | %50 A, 50% B | 500 | 64.3 | 1 |
| 17 | H | 500 | 64.6 | 1 |
| 18 | H | 500 | 13.7 | — |
| 19 | G | 500 | 5.4 | 1 |
| 20 | C | 300 | 22.6 | 2 |

| Oil Source Rockies- Crude #2 Product | WAT, °F. (°C.) 88 (31) Dose (ppm) | Probe Temp, °F. (°C.) 93 (34) Percent Inhibition | Oil Temp, °F. (°C.) 68 (20) Fig. Reference |
|---|---|---|---|
| 21 | A | 250 | 19.3 | 3 |
| 22 | B | 250 | 24.1 | 3 |
| 23 | C | 250 | 26.3 | 3 |

Figure 2:
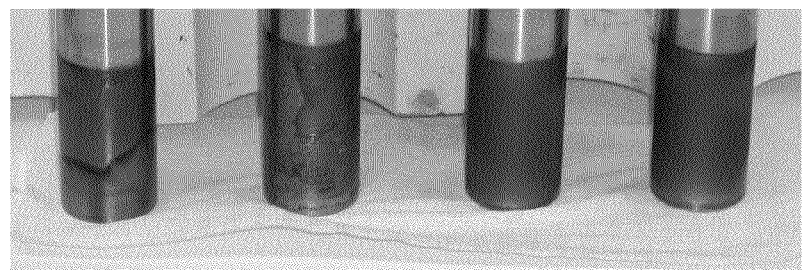
FIG. 2 is a photograph of cold finger probes from various products used in a blank and Examples 12, 15 and 20 used with a description of the appearance of each.
Figure 3:
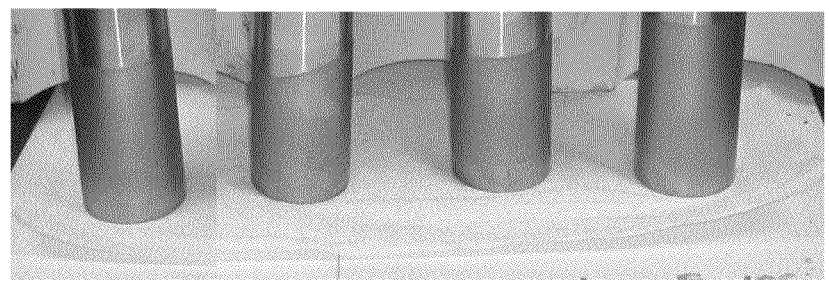
FIG. 3 is a photograph of cold finger probes from various products used in a blank and Examples 21, 22 and 23 used with a description of the appearance of each.

It may be seen that the copolymers described herein inhibit the paraffin deposition in these crudes as described. This may also be seen with respect to the Figures. Examples 10, 13, 16 and 17 gave paraffin inhibition with thin deposits compared to the thick deposit on the blank, whereas in Example 19 using Product G there was inhibition, but not to as great an extent, since the description is the same as that of the blank. In FIG. 2, Examples 12, 15 and 20 using Products A, B and C, respectively, gave better (thinner) deposits compared with the blank. In FIG. 3, Examples 21, 22 and 23 using Products A, B and C, respectively, gave better (thinner) deposits than the blank. Rockies Crude #1a and #1b were from the same field, but were collected at different times. The cloud point was different and therefore the testing conditions were also different. Rockies Crude #2 was a completely different oil with different paraffinic content from Crude #1. It should be understood that not all products effective in one crude will necessarily work in another crude.

Figure 4:
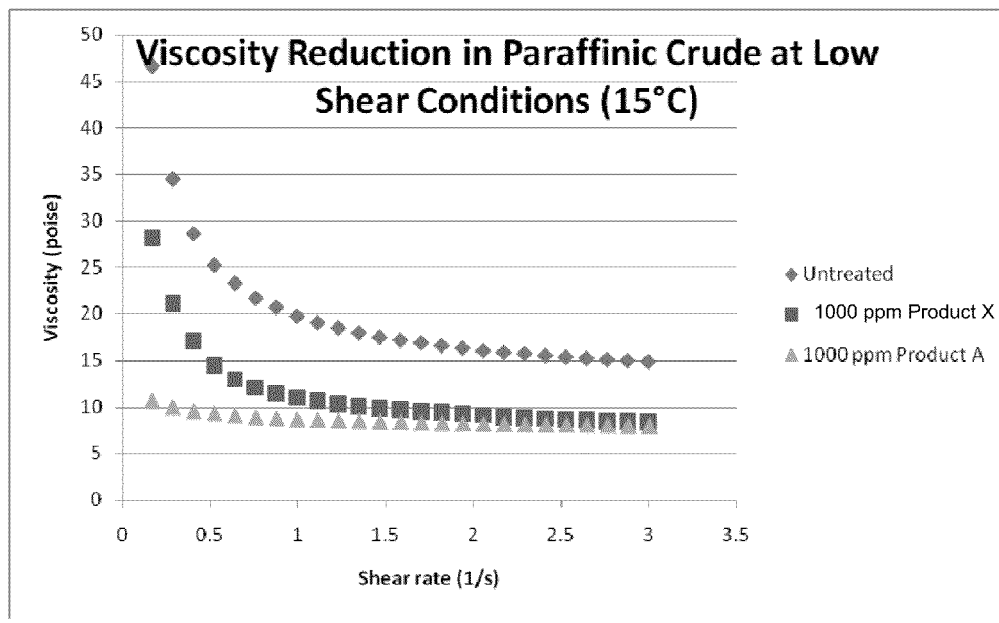
FIG. 4 is a graph of viscosity reduction in paraffinic crude as a function of low shear conditions at 15° C. where the crude is untreated, treated with 1000 ppm commercial Product X and treated with 1000 ppm of Product A.

FIG. 4 is a graph of viscosity reduction in a paraffinic crude as a function of low shear conditions at 15° C. where the crude is untreated, treated with 1000 ppm commercial paraffin inhibitor (also known as a crystal modifier or dispersant) Product X and treated with 1000 ppm of Product A. While commercial Product X considerably reduces the viscosity as compared with the curve for the untreated crude, Product A reduces the viscosity even more rapidly than Product X. The viscosity of these crudes is directly related to the paraffin present in crystallized or precipitated form. Thus, Product A demonstrates an additional advantage over commercial Product X.

It is to be understood that the invention is not limited to the exact details of monomers, reaction conditions, proportions, crude oils, etc. shown and described, as modifications and equivalents will be apparent to one skilled in the art. The invention is therefore to be limited only by the scope of the appended claims. Further, the specification is to be regarded in an illustrative rather than a restrictive sense. For example, specific combinations of lactone monomers, alkylene oxide monomers, hydroxyl- and/or amine-containing base compounds or starting materials, reactant proportions, reaction conditions, molecular weights, dosages, hydrocarbon fluids, crude oils, and the like falling within the described parameters herein, but not specifically identified or tried in a particular method or apparatus, are expected to be within the scope of this invention.

The terms "comprises" and "comprising" used in the claims herein should be interpreted to mean including, but not limited to, the recited elements. The present invention may suitably comprise, consist or consist essentially of the elements disclosed and may be practiced in the absence of an element not disclosed. For instance, the method of inhibiting the deposition of paraffin in a hydrocarbon fluid may consist of or consist essentially of adding to the hydrocarbon fluid an effective amount of a polymer to inhibit the deposition of paraffin therein, where the polymer includes, but is not necessarily limited to, a random or block polymer made from addition reactions of a hydroxyl- and/or amine-containing base compound with at least one lactone monomer and at least one alkylene oxide monomer and/or a random or block polymer made from addition reactions of a hydroxyl- and/or amine-containing base compound with at least one alkylene oxide monomer, as compared with the absence of the polymer.

What is claimed is:

1. A method of modifying the behavior of paraffin in a hydrocarbon fluid, the method comprising:
   adding to the hydrocarbon fluid comprising paraffin an effective amount of a polymer to modify the behavior of paraffin therein, where the hydrocarbon fluid is selected from the group consisting of crude oil, condensate, and home heating oil, where the polymer comprises one selected from the group consisting of:
     a random or block polymer made from addition reactions of a base compound selected from the group consisting of hydroxyl-containing base compounds, amine-containing base compounds and combinations thereof, with at least one lactone monomer and at least one alkylene oxide monomer,
     a random or block polymer made from addition reactions of a base compound selected from the group consisting of hydroxyl-containing base compounds, amine-containing base compounds and combinations thereof, with at least one alkylene oxide monomer, and
     combinations thereof;
   measuring paraffin deposition for the hydrocarbon fluid both with and without the polymer by a method comprising:
     setting a cold finger probe to a temperature below the crude oil Wax Appearance Temperature (WAT) of the hydrocarbon fluid,
     setting the crude oil temperature to be at or above the WAT,
     stirring the crude oil,
     inserting the cold finger probe into the stirred crude oil for about 16 hours, and
     comparing by weight a deposition on the cold finger probe for the hydrocarbon fluid with the polymer to a deposition on the cold finger probe for the hydrocarbon fluid without the polymer, and
     determining if there is a difference between the density of the depositions that indicates paraffin behavior modification;
   where the modification of paraffin behavior is selected from the group consisting of inhibiting or preventing the deposition of paraffin, modifying the crystal structure of the paraffin, lowering the pour point of the hydrocarbon fluid and dispersing the paraffin in the hydrocarbon fluid, as compared to the paraffin behavior in the absence of the polymer.

2. The method of claim 1 where:
the at least one lactone monomer is selected from the group of lactones of formula (I) having 3 to 7 carbon atoms in the central ring, where formula (I) has the chemical structure:

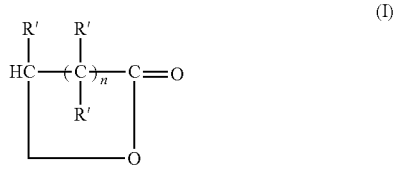

(I)

where n is at least 1 and R' are independently hydrogen, alkyl, cycloalkyl, or aromatic group; and
the at least one alkylene oxide monomer is selected from the group consisting of ethylene oxide, propylene oxide, butylene oxide, and mixtures thereof; and
the hydroxyl- or amine-containing base compound is selected from the group consisting of methanol; propylene glycol; glycerol; pentaerythritol; sucrose; glucose; sorbitol; fructose; maltitol; polyvinyl alcohol; polysaccharides selected from the group consisting of starch derivatives, hydroxyl ethyl cellulose (HEC), carboxy methyl cellulose (CMC), and cyclodextrin; polyesters; polyethers; polyacids; polyamides; hydroxylamines; polyethyleneimines; peptides; and combinations thereof.

3. The method of claim 2 where the hydroxyl- or amine-containing base compound is a hydroxylamine that is selected from the group consisting of ethanolamine; diethanolamine; triethanolamine, and mixtures thereof.

4. The method of claim 1 where:
the weight ratio of at least one lactone monomer to the hydroxyl- or amine-containing base compound ranges from about 0.1:1 to about 99.9:1; and
the weight ratio of at least one alkylene oxide monomer to the hydroxyl- or amine-containing base compound ranges from about 99.9:1 to about 0.1:1.

5. The method of claim 1 where the weight average molecular weight of the polymer ranges from about 2000 to about 1,500,000 g/mol.

6. The method of claim 1 where the effective amount of the polymer ranges from about 5 to about 10,000 ppm, based on the hydrocarbon fluid.

7. The method of claim 1 where the polymer is capped by reaction with a monofunctional monomer selected from the group consisting of monoepoxides, monofunctional carboxylic acids, and combinations thereof.

8. The method of claim 7 where the monofunctional monomer is selected from the group consisting of styrene oxide, glycidal ether, benzylglycidal ether, C1-C24 glycidal ether, acid anhydrides, C2-C24 carbocyclic acids, and combinations thereof.

9. The method of claim 1 where the polymer is blended with at least one additional polymer selected from the group consisting of ethylene-vinyl acetate (EVA), alkylphenol formaldehyde resins, and combinations thereof.

10. A method of modifying the behavior of paraffin in a hydrocarbon fluid, the method comprising:
adding to the hydrocarbon fluid comprising paraffin from about 5 to about 10,000 ppm, based on the hydrocarbon fluid, of a polymer to modify the behavior of paraffin therein, where the hydrocarbon fluid is selected from the group consisting of crude oil, condensate, and home heating oil, where the polymer comprises one selected from the group consisting of:
a random or block polymer made from addition reactions of a base compound selected from the group consisting of hydroxyl-containing base compounds, amine-containing base compounds and combinations thereof, with at least one lactone monomer and at least one alkylene oxide monomer,
a random or block polymer made from addition reactions of a base compound selected from the group consisting of hydroxyl-containing base compounds, amine-containing base compounds and combinations thereof, with at least one alkylene oxide monomer, and
combinations thereof;
where the polymer has a weight average molecular weight of the polymer ranges from about 2000 to about 1,500,000 g/mol, and
measuring paraffin deposition for the hydrocarbon fluid both with and without the polymer by a method comprising:
setting a cold finger probe to a temperature below the crude oil Wax Appearance Temperature (WAT) of the hydrocarbon fluid,
setting the crude oil temperature to be at or above the WAT,
stirring the crude oil,
inserting the cold finger probe into the stirred crude oil for about 16 hours, and
comparing by weight a deposition on the cold finger probe for the hydrocarbon fluid with the polymer to a deposition on the cold finger probe for the hydrocarbon fluid without the polymer, and
determining if there is a difference between the density of the depositions that indicates paraffin behavior modification;
where the modification of paraffin behavior is selected from the group consisting of inhibiting or preventing the deposition of paraffin, modifying the crystal structure of the paraffin, lowering the pour point of the hydrocarbon fluid and dispersing the paraffin in the hydrocarbon fluid, as compared to the paraffin behavior in the absence of the polymer.

11. The method of claim 10 where:
the at least one lactone monomer is selected from the group of lactones of formula (I) having 3 to 7 carbon atoms in the central ring, where formula (I) has the chemical structure:

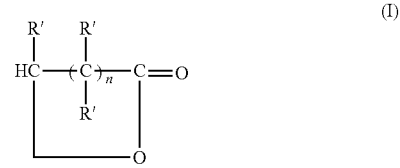

(I)

where n is at least 1 and R' are independently any hydrogen, alkyl, cycloalkyl, or aromatic group; and
the at least one alkylene oxide monomer is selected from the group consisting of ethylene oxide, propylene oxide, butylene oxide and mixtures thereof; and the hydroxyl- or amine-containing base compound is selected from the group consisting of methanol; propylene glycol; glycerol; pentaerythritol; sucrose; glucose; sorbitol; fructose; maltitol; polyvinyl alcohol, polysaccharides selected from the group consisting of starch derivatives, hydroxyl ethyl cellulose (HEC), carboxy methyl cellulose (CMC) and cyclodextrin; polyesters; polyethers; polyacids; polyamides; hydroxylamines; polyethyleneimines; peptides; and combinations thereof.

12. The method of claim 11 where the hydroxyl- or amine-containing base compound is a hydroxylamine that is selected from the group consisting of ethanolamine; diethanolamine; triethanolamine, and mixtures thereof.

13. The method of claim 10 where:

the weight ratio of at least one lactone monomer to the hydroxyl- or amine-containing base compound ranges from about 0.1:1 to about 99.9:1; and the weight ratio of at least one alkylene oxide monomer to the hydroxyl- or amine-containing base compound ranges from about 99.9:1 to about 0.1:1.

14. The method of claim 10 where the polymer is capped by reaction with a monofunctional monomer selected from the group consisting of monoepoxides, monofunctional carboxylic acids, and combinations thereof.

15. The method of claim 14 where the monofunctional monomer is selected from the group consisting of styrene oxide, glycidal ether, benzylglycidal ether, C1-C24 glycidal ether, acid anhydrides, C2-C24 carbocyclic acids; and combinations thereof.

16. A method of modifying the behavior of paraffin in a hydrocarbon fluid, the method comprising:

adding to the hydrocarbon fluid comprising paraffin from about 5 to about 1000 ppm, based on the hydrocarbon, to modify the behavior of paraffin therein, where the hydrocarbon fluid is selected from the group consisting of crude oil, condensate, and home heating oil, where the polymer comprises one selected from the group consisting of:

a random or block polymer made from addition reactions of a base compound selected from the group consisting of hydroxyl-containing base compounds, amine-containing base compounds and combinations thereof, with at least one lactone monomer and at least one alkylene oxide monomer, a random or block polymer made from addition reactions of a base compound selected from the group consisting of hydroxyl-containing base compounds, amine-containing base compounds and combinations thereof, with at least one alkylene oxide monomer, and combinations thereof where:

the at least one lactone monomer is selected from the group of lactones of formula (I) having 3 to 7 carbon atoms in the central ring, where formula (I) has the chemical structure:

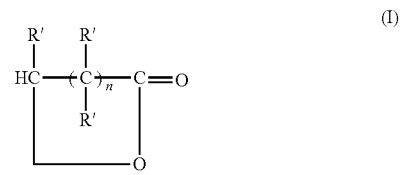

(I)

where n is at least 1 and R' are independently any hydrogen, alkyl, cycloalkyl, or aromatic group; and the at least one alkylene oxide monomer is selected from the group consisting of ethylene oxide, propylene oxide, butylene oxide and mixtures thereof; and the hydroxyl- or amine-containing base compound is selected from the group consisting of methanol; propylene glycol; glycerol; pentaerythritol; sucrose; glucose; sorbitol; fructose; maltitol; polyvinyl alcohol; polysaccharides selected from the group consisting of starch derivatives, hydroxyl ethyl cellulose (HEC), carboxy methyl cellulose (CMC) and cyclodextrin; polyesters; polyethers; polyacids; polyamides; hydroxylamines; polyethyleneimines; peptides; and combinations thereof, measuring paraffin deposition for the hydrocarbon fluid both with and without the polymer by a method comprising:

setting a cold finger probe to a temperature below the crude oil Wax Appearance Temperature (WAT) of the hydrocarbon fluid, setting the crude oil temperature to be at or above the WAT, stirring the crude oil, inserting the cold finger probe into the stirred crude oil for about 16 hours, and comparing by weight a deposition on the cold finger probe for the hydrocarbon fluid with the polymer to a deposition on the cold finger probe for the hydrocarbon fluid without the polymer, and determining if there is a difference between the density of the depositions that indicates paraffin behavior modification;

where the modification of paraffin behavior is selected from the group consisting of inhibiting or preventing the deposition of paraffin, modifying the crystal structure of the paraffin, lowering the pour point of the hydrocarbon fluid and dispersing the paraffin in the hydrocarbon fluid, as compared to the paraffin behavior in the absence of the polymer.

17. The method of claim 16 where the hydroxyl- or amine-containing base compound is a hydroxylamine that is selected from the group consisting of ethanolamine; diethanolamine; triethanolamine, and mixtures thereof.

18. The method of claim 16 where:

the weight ratio of at least one lactone monomer to the hydroxyl- or amine-containing base compound ranges from about 0.1:1 to about 99.9:1; and the weight ratio of at least one alkylene oxide monomer to the hydroxyl- or amine-containing base compound ranges from about 99.9:1 to about 0.1:1.

19. The method of claim 16 where the weight average molecular weight of the polymer ranges from about 2000 to about 1,500,000 g/mol.

* * * * *